(12) United States Patent
Noda

(10) Patent No.: US 8,982,372 B2
(45) Date of Patent: Mar. 17, 2015

(54) IMAGE FORMING APPARATUS, IMAGE FORMATION CONTROL METHOD, AND RECORDING MEDIUM WHICH STORES IMAGE CONTROL PROGRAM AND IS READABLE BY COMPUTER

(71) Applicant: Yoriko Noda, Hinoshi (JP)

(72) Inventor: Yoriko Noda, Hinoshi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/857,842

(22) Filed: Apr. 5, 2013

(65) Prior Publication Data
US 2013/0265610 A1    Oct. 10, 2013

(30) Foreign Application Priority Data
Apr. 9, 2012    (JP) ................................. 2012-088594

(51) Int. Cl.
*H04N 1/40* (2006.01)
*G06K 15/02* (2006.01)
*H04N 1/407* (2006.01)
*H04N 1/60* (2006.01)
*G06F 3/12* (2006.01)

(52) U.S. Cl.
CPC ............ *G06K 15/1881* (2013.01); *H04N 1/407* (2013.01); *H04N 1/6027* (2013.01); *G06F 3/1204* (2013.01); *G06F 3/1256* (2013.01); *G06F 3/1257* (2013.01); *G06F 3/1205* (2013.01); *G06F 3/1208* (2013.01); *G06F 2206/1514* (2013.01)
USPC ........... 358/1.13; 358/406; 358/504; 358/468

(58) Field of Classification Search
USPC ........ 358/1.9, 2.1, 500, 504, 1.13, 1.15–1.16, 358/400, 406, 468
See application file for complete search history.

(56) References Cited

U.S. PATENT DOCUMENTS

| | | | |
|---|---|---|---|
| 7,809,186 B2 * | 10/2010 | Takahashi | ..................... 382/162 |
| 8,115,939 B2 | 2/2012 | Yamada | |
| 2005/0093989 A1 * | 5/2005 | Imai | ........................... 348/222.1 |

FOREIGN PATENT DOCUMENTS

| | | |
|---|---|---|
| JP | 09-069945 A | 3/1997 |
| JP | 2000-004369 A | 1/2000 |
| JP | 2000-115537 A | 4/2000 |
| JP | 2009-037398 A | 2/2009 |

* cited by examiner

*Primary Examiner* — Thomas D Lee
*Assistant Examiner* — Stephen M Brinich
(74) *Attorney, Agent, or Firm* — Holtz, Holtz, Goodman & Chick PC

(57) ABSTRACT

An image forming apparatus includes an image processing section to process gradation characteristic of the image data based on a tone curve, an image forming section to form an image based on the image data processed by the image processing section; and a control section to control processing in the image processing section. The control section has a function to adjust characteristic of output density relative to input density of image data as the gradation characteristic as a tone curve via a setting screen, saves operational situations at the time of adjustment of the tone curve on the setting screen as a history, and, when the history is designated, reproduces a state at the time of the past adjustment for the tone curve on the setting screen by using the saved operational situations.

18 Claims, 7 Drawing Sheets

IMAGE FORMING APPARATUS, IMAGE FORMATION CONTROL METHOD, AND RECORDING MEDIUM WHICH STORES IMAGE CONTROL PROGRAM AND IS READABLE BY COMPUTER

BACKGROUND OF THE INVENTION

1. Field of the Invention

The present invention relates to a technique to process the gradation characteristic of image data based on a tone curve in an image forming apparatus and an image control program.

2. Description of Related Art

In order to obtain print output matters desired by a user, a tone curve which shows output density relative to input density is set up based on a user's designation in a host device, such as a personal computer. Then, it is possible to perform gradation correction (γ correction) of image data by use of the set-up tone curve. Here, the tone curve means a conversion curve used to convert the characteristic of an image.

However, in order to obtain the print output matters in the actually-desired state, the adjustment of this tone curve requires sensitive operations. Accordingly, as described in the following patent documents, techniques to apply various devisals are proposed.

JPA (Japanese Unexamined Patent Publication) No. 9-69945 Official Report, proposes devisals at the time of display of image applied with an adjusted tone curve on a screen. JPA 2000-115537 proposes devisals to enable fine adjustment on the state that a part of a tone curve is enlarged. Further, JPA 2009-037398 proposes a technique to receive a tone curve set up or adjusted by a host device and to adopt (apply) the tone curve at an image forming apparatus side.

SUMMARY OF THE INVENTION

Here, as a result of detailed studies about the adjustment of tone curves by the inventor of the present invention, the following matters became clear. Namely, in the case where a desired gradation was not obtained even when printing it after adjustment of a tone curve, it became clear that, in many cases, the poor gradation was attributed to the previous adjustment of the tone curve by an operator. Then, it also became clear that, in many cases, the operator looked for the previously-adjusted portions (for example, the adjusted points of the tone curve (the control points of the tone curve) and the amount of adjustment) and repeated readjustment for them. Further, it turned out that due to the above reasons, the time for repeating operations, such as adjustment of tone curves and execution of printing after the adjustment, has been increasing, and also the time for looking for the previously-adjusted portions has been increasing.

In the conventional image processing, after the gradation correction was executed by changing the shape of a tone curve, the past information regarding the operations for the tone curve did not remain, and the tone curve on the setting screen was reset and became a straight line state. Accordingly, it became unclear that what kind of adjustment was carried out before. For this reason, it becomes difficult to perform operations, such as fine adjustment for the shape of a tone curve and correction to return the fine adjustment to the original state. Further, for the same reason, in the case where the past adjustment states are felt to be better rather than the current adjustment state and a desire arises in a request to return the current adjustment state to an adjustment state at a certain stage in the past adjustment states, it is very difficult to return the current state to the past state.

An object of the present invention is to reduce the number of processes in gradation correction of image data by use of a tone curve and working hours.

In order to attain at least one of the objects of the present invention, according to an image forming apparatus reflecting an aspect of the present invention, the image forming apparatus comprises: an image processing section configured to process gradation characteristic of image data based on a tone curve; an image forming section configured to form an image based on the image data processed by the image processing section; and a control section having a function to adjust characteristic of output density relative to input density of image data as the gradation characteristic as a tone curve via a setting screen; wherein the control section saves operational situations at the time of adjustment of the tone curve on the setting screen as a history, and when the history is designated, the control section reproduces the state at the time of the past adjustment for the tone curve on the setting screen by using the saved operational situations.

Herein, it is desirable that the operational situations are saved as the history in a state including at least a control point and an adjustment value of the tone curve.

Further, it is desirable that the operational situations are saved as the history for each time when the tone curve is adjusted on the setting screen or for each time when an image is formed at the image forming section.

Furthermore, it is desirable that the operational situations are saved as the history for one of each job, each page of image data, and each region in a page of image data.

DETAILED DESCRIPTION OF THE INVENTION

Figure 1:
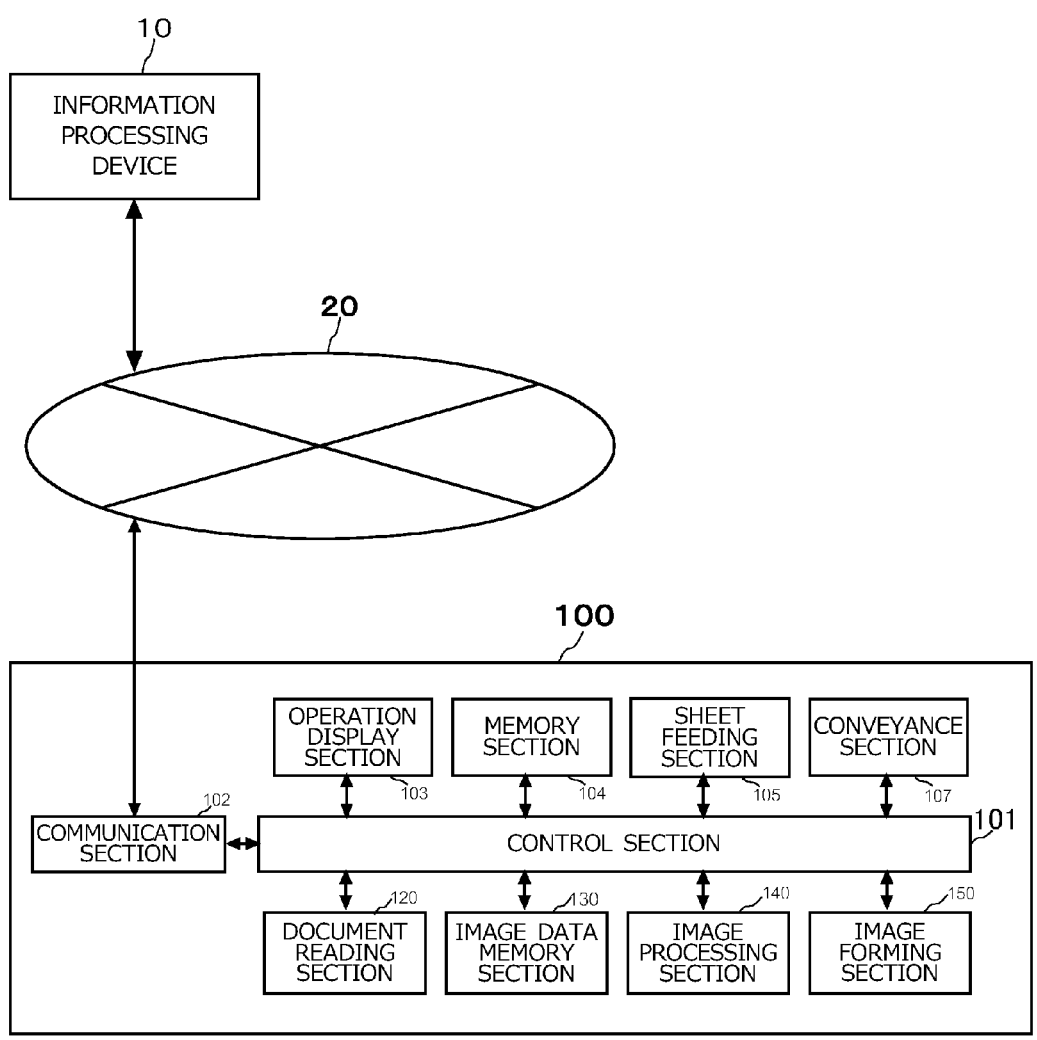
FIG. 1 is a structural diagram illustrating an outline structure in an embodiment of the present invention.

Hereafter, with reference to the drawings, description will be given to an embodiment of an image forming apparatus which can reduce the number of processes in gradation correction of image data by use of a tone curve and working hours and can return the current state to the state at the time of previous adjustment in the gradation correction of image data by use of the tone curve. Herein, this embodiment of the image forming apparatus is also an embodiment of each of an image formation control method and an image control program. Further, a job refers to a series of actions in association with image formation, for example, in the case where images of multiple pages are formed on paper sheets and output, a series of actions in association with image formation of the multiple pages is one job.

[Structure]

Here, the structure of an image forming apparatus 100 and peripheral devices will be described in detail based on FIG. 1. In this description, a system which includes an information processing device (hereafter, referred to as PC) 10 serving as a print setting device, a network 20, and the image forming apparatus 100, will be explained as a specific example. Further, in the following description, components relevant to the characteristic actions of the embodiment will be described mainly, and description for generally-known components will be omitted.

The PC 10 includes a print job producing unit, and a tone curve setting unit, and a communication unit. Here, the print job producing unit generates print jobs containing image data used for image formation in the image forming apparatus 100. The tone curve setting section sets a tone curve to be applied to image data at the time of image formation, i.e., information to be applied to the image data. The communication unit transmits job information including a tone curve and image data by communicating with the image forming apparatus 100 via the network 20.

Further, the network 20 may be one of various networks of a cable type and a wireless type, and examples of the network 20 include not only a network based on TCP/IP protocol, but also include various communication means of a cable type and a wireless type which are used for connecting the PC 10 and the image forming apparatus 100.

As the image forming apparatus 100, various image forming apparatuses can be applied. This image forming apparatus 100 is described with reference to specific examples, such as a multi function printer (MFP) which can be connected to a network and includes functions of a scanner, copier, printer, and facsimile, and an image forming apparatus usable in the printing field. In this regard, description for general components, which are already known as the components of the image forming apparatus 100 and are not directly related to the characteristic actions and control of the present embodiment, will be omitted.

The image forming apparatus 100 includes a control section 101, a communication section 102, an operation display section 103, a memory section 104, a sheet feeding section 105, a conveyance section 107, a document reading section 120, an image data memory section 130, an image processing section 140, and an image forming section 150. Further, if needed, a sheet on which images are formed by the image forming apparatus 100 will be applied with various types of post processing by a not-shown post processing apparatus.

Here, the control section 101 is configured to control each section in the image forming apparatus 100, and to control the whole system as a post processing apparatus. This control section 101 includes CPU (Central Processing Unit), ROM (Read Only Memory), RAM (Random Access Memory), and the like which are not shown. Here, the CPU uses a predetermined region of the RAM as a work area, executes various programs stored in the ROM, and controls comprehensively each section of the image forming apparatus 100. Further, at the time of adjusting the characteristics of output density relative to input density as a tone curve via a setting screen with reference to the gradation characteristics of image data, the control section 101 has functions to save operational situations of items relative to a tone curve on the setting screen as a history, and, when the history is designated, to reproduce a state at the time of the past adjustment for the tone curve by using the saved operational situation.

The communication section 102 is used at the time of communicating with other apparatus being connected to the network. The operation display section 103 notifies operation input signals corresponding to operational inputs by an operator to the control section 101, and displays the state of the image forming apparatus 100. This operation display section 103 includes input devices, such as a keyboard, a mouse, a touch panel, and the like, and transmits various input instruction signals to the control section 101. Further, the operation display section 103 includes display devices, such as a liquid crystal display unit (LCD (Liquid Crystal Display)), and displays various image data input from the control section 101 as an operation screen. Although this operation display section may be separated into an operation section and a display section, it may be a touch panel which allows displayed icons or keys (hereafter, referred to as "key") to be pushed down.

The memory section 104 stores control programs and various setting data, and is used as a work area of control programs. The sheet feeding section 105 feeds accommodated paper sheets to the image forming section 150. The conveyance section 107 conveys at a predetermined speed a paper sheet which is fed from the sheet feeding section 105, and used for image formation. The document reading section 120 scans a document and generates image data. The image data memory section 130 stores image data and various data at the time of image formation. The image processing section 140 performs various kinds of image processing required for image formation.

The image forming section 150 executes image formation (printing) based on an image formation command and image data. This image forming section 150 may be an image forming section of an electro-photography type or various types or a printing device, and is configured to form and output images on a predetermined paper sheet in a copying machine, a printer, a facsimile apparatus, and the like.

In the present embodiment, the tem "density" implies the concept of lightness and brightness and is used as a concept generally including a factor treated as signal values.

[Action]

Hereafter, with reference to a flowchart of FIG. 2 and explanatory drawings following FIG. 3, description will be given to the actions of the image forming apparatus, the processing procedures of an image formation control method and image control programs in the present embodiment.

In the PC 10, image data to be used for image formation are produced or selected, various types of designation such as the number of print sets and existence or nonexistence of post processing are set up as print information, and these image data are subjected to adjustment based on a tone curve. Then, the PC 10 transmits the image data provided with the print information and the job information including the result of a tone curve adjustment to the image forming apparatus 100 via the network 20. In this regard, in this processing in the PC 10, the publicly-know method proposed by the applicant in Japanese Unexamined Patent Publication No. 2009-37398 may be employed.

Subsequently, upon receipt of the job information containing the print information and the result of a tone curve adjustment and the image data, the image forming apparatus 100 acts in the following ways. The actions of the image forming apparatus 100 are realized via execution of the image control programs by the control section 101. That is, the CPU 101 executes the image control programs stored in the memory section 104 on the RAM, thereby performing the actions. Further, since these image control programs include a tone curve adjustment program, whereby a tone curve adjustment mentioned below is executed.

Figure 2:
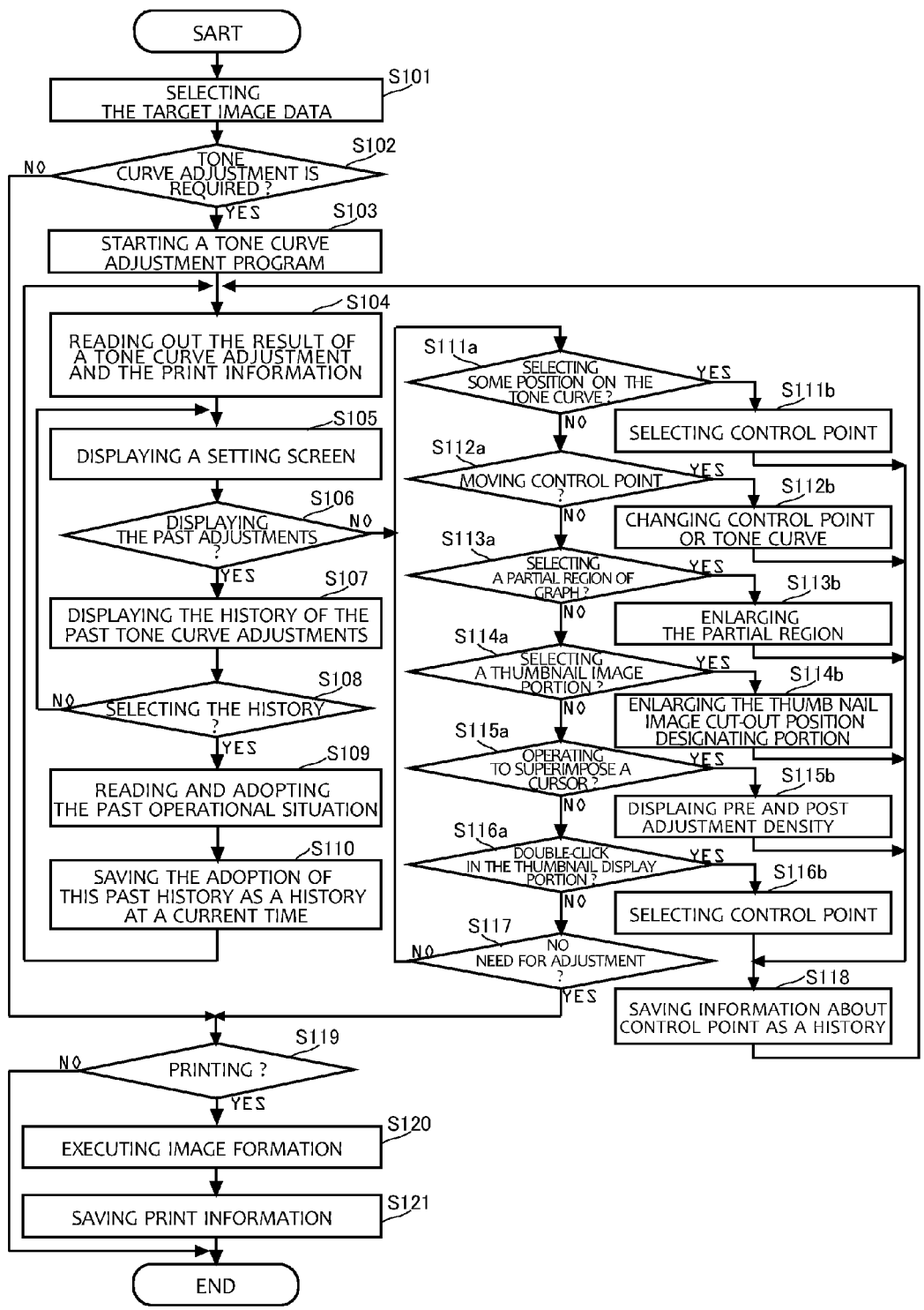
FIG. 2 is a flowchart illustrating actions in the embodiment of the present invention.

First, at the time of execution of image formation, the control section 101 selects the target image data based on an input at the operation display section 103 by an operator (Step S101 in FIG. 2). For example, in the stat that a plurality of image data stored in an image data memory section 130 are displayed in the form of a list on an operation screen (not shown) of the operation display section 103, the image data to be used for image formation are selected via an operation by an operator on the operation display section 103.

At a point of time when the image data to be used for image formation are selected by the operator, the control section 101 judges whether it is necessary to further adjust the result of a tone curve adjustment transmitted together with the image data from the PC 10 (Step S102 in FIG. 2). That is, on the operation screen (not shown) of the operation display section 103 when the image data to be used for image formation are selected, if a key or an icon for a tone curve adjustment is pushed down, the control section 101 judges that a tone curve adjustment is required. Further, on the operation screen (not shown) of the operation display section 103 when the image data to be used for image formation are selected, if a key or an icon for execution of image formation is pushed down without pushing down a key or an icon for a tone curve adjustment, the control section 101 judges that a tone curve adjustment is not required.

Here, on the operation screen (not shown) of the operation display section 103 where the image data to be used for image formation are selected, when a key or an icon for a tone curve adjustment is pushed down, the control section 101 judges that a tone curve adjustment is required (YES at Step S102 in FIG. 2), and starts a tone curve adjustment program (Step S103 in FIG. 2).

The control section 101 reads out the result of a tone curve adjustment (operational situations at the tone curve adjustment) and the print information, which are related to the target image data, in accordance with the tone curve adjustment program (Step S104 in FIG. 2).

Examples of the contents to be read as the result of a tone curve adjustment include:

Control point and adjustment value of a tone curve,
Display magnification of thumbnails,
Cut-out position of thumbnails,
Point of selection of thumbnails, and
Tone curve graph scale display magnification.

In the case where the newest information of these items exists, the contents to be read are the information of their histories (operational situations in the past tone curve adjustment) of these items. These contents are described in detail in later with reference to drawings.

Subsequently, the control section 101 applies the result of the tone curve adjustment read in accordance with the tone curve adjustment program, and further displays a setting screen 1000, on which a tone curve can be adjusted, on the operation display section 103 (Step S105 in FIG. 2). Operations (push-down of button, selection of arbitrary position or region, and shift operation) on this setting screen 1000 are notified from the operation display section 103 to the control section 101.

Figure 3:
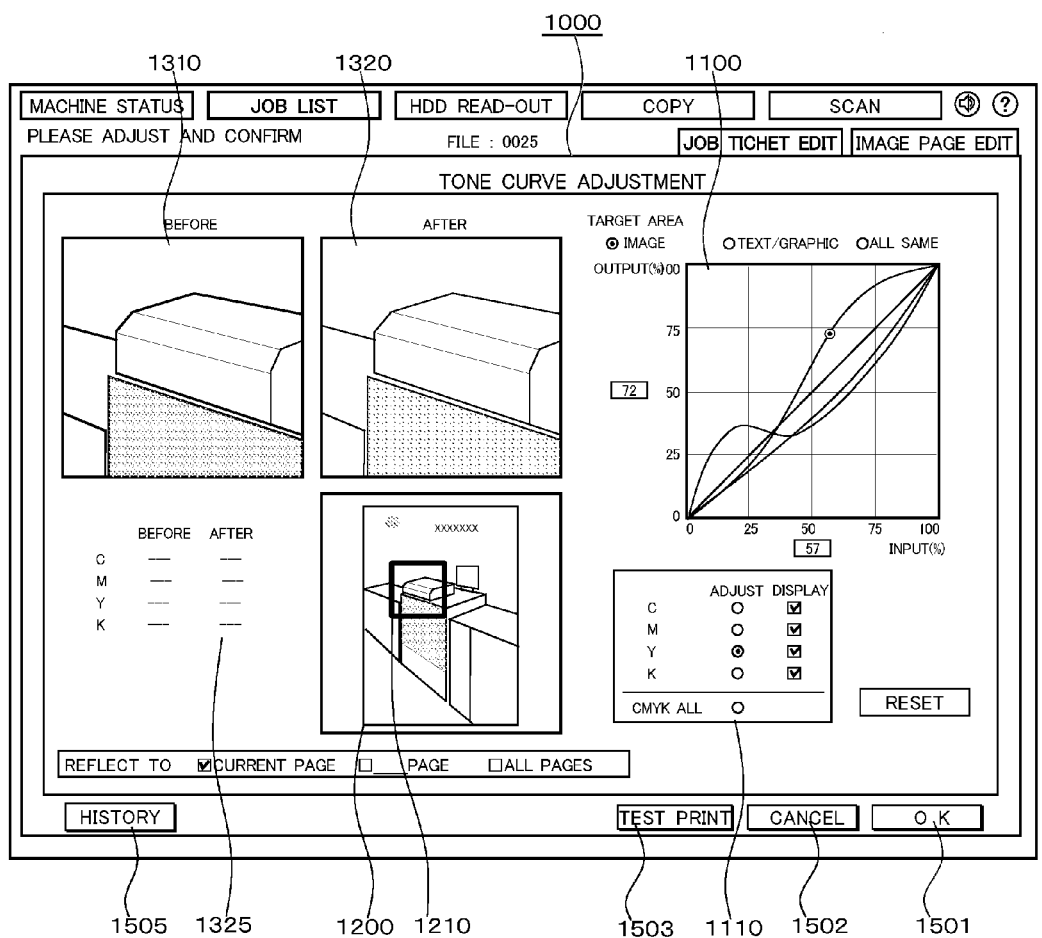
FIG. 3 is an explanatory drawing for explaining the embodiment of the present invention.

FIG. 3 shows the situation that the setting screen 1000 for a tone curve adjustment is displayed on a display screen of the operation display section 103 by the control of the control section 101.

In this setting screen 1000, on a tone curve graph 1100, tone curves of four colors of C (cyan), M (Magenta), Y (yellow), and K (black) which are used for image formation, are displayed. Herein, the tone curve is the characteristic (gradation characteristic) of output density relative to input density of image data. Further, the setting screen 1000 is constituted such that on a part of the tone curve graph 1100, the shape of a tone curve can be changed by moving an arbitrary point on the tone curve upward and downward as a control point. In the tone curve graph display setting section 1110, in association with four colors of CMYK, setting items as to which tone curve to be displayed and which tone curve to be adjusted are displayed to be settable.

In the thumbnail display portion 1200, target image data are displayed as a thumbnail image in a reduced state. Further, a region designated by a thumbnail image cut-out position designating portion 1210 is enlarged and displayed on a pre-adjustment thumbnail enlarging display portion 1310 and a post-adjustment thumbnail enlarging display portion 1320. Here, the image before the tone curve adjustment are displayed on the pre-adjustment thumbnail enlarging display portion 1310, and while the image after the tone curve adjustment are displayed on the post-adjustment thumbnail enlarging display portion 1320.

Further, on the setting screen 1000, an OK button 1501, a cancel button 1502, a test print button 1503, and a history button 1505 are displayed at a lower part of the screen. Here, the OK button 1501 is pushed down when a tone curve adjustment has been completed. The cancel button 1502 is pushed down when a tone curve adjustment is cancelled and ended. The test print button 1503 is pushed down when a tone curve adjustment is confirmed via a test print. The history button 1505 is pushed down when the histories of the past tone curve adjustments are displayed in a list.

In FIG. 3, when an operator operates some portion on the setting screen 1000 without pushing down the history button 1505, it is possible to further adjust the result of the tone curve adjustment adjusted by the PC 10 (NO at Step S106, S111a, S112a, S113a, S114a, S115a, and S116a in FIG. 2).

Figure 4:
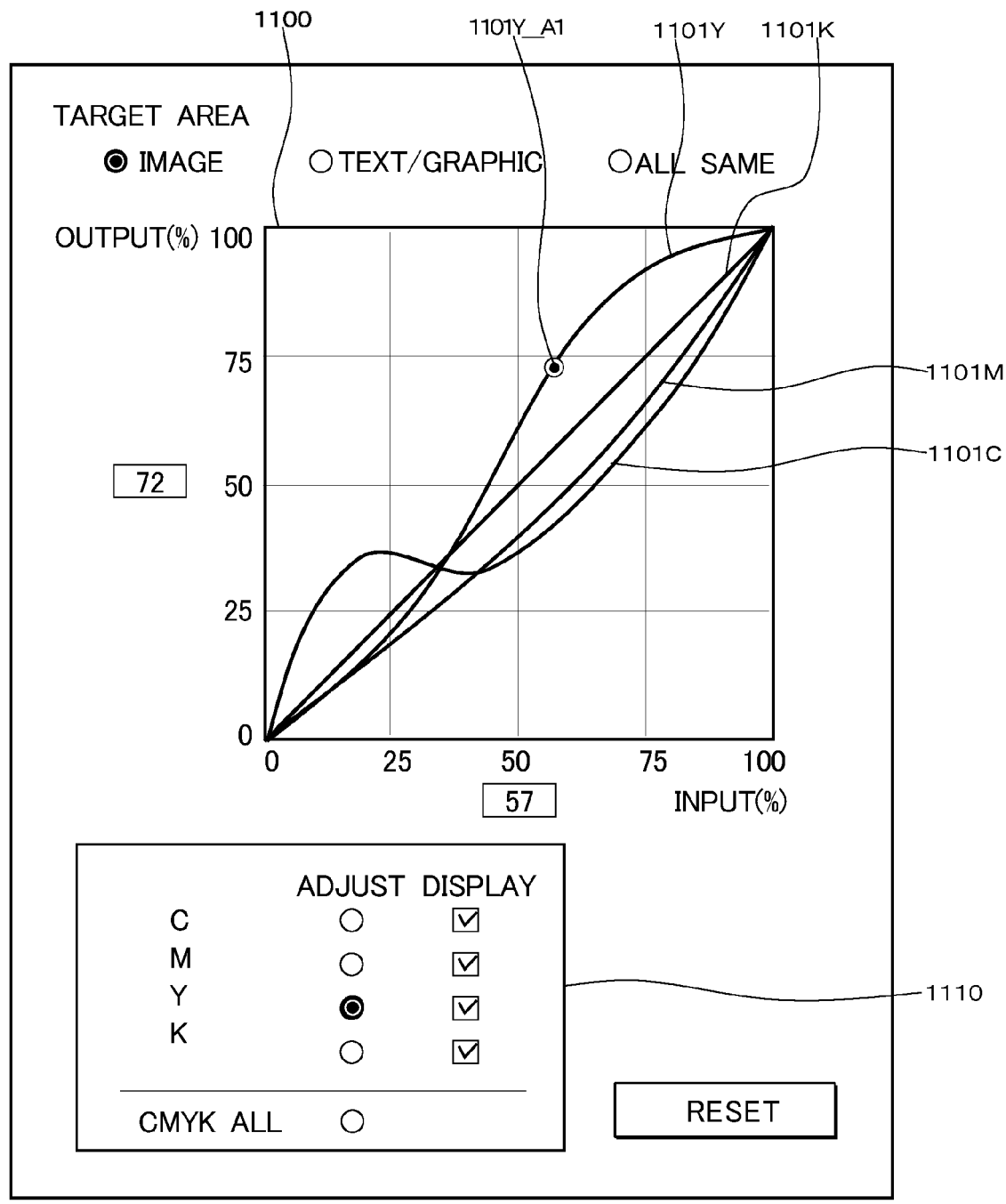
FIG. 4 is an explanatory drawing for explaining the embodiment of the present invention.

In FIG. 4, the situation of the tone curve graph 1100 and the tone curve graph display setting section 1110 each of which is a part of the setting screen 1000 of FIG. 3 is enlarged and displayed.

In the example shown in FIG. 3 and FIG. 4, tone curves of four colors of CMYK (a tone curve 1101C for cyan, a tone curve 1101M for magenta, a tone curve 1101Y for yellow, and a tone curve 1101K for black) are displayed, and the tone curve 1101Y for yellow is displayed in a state of being adjustable. Further, by setting the other color tone curve to be adjustable in the tone curve graph display setting section 1110, similarly, it becomes possible to adjust the other color tone curve.

Here, in the tone curve adjustment on the tone curve graph 1100, an operator selects some position on the tone curve 1101Y of yellow by using a pointing device of the operation display section 103 (YES in Step S111a in FIG. 2). At this time, when a position where a control point already exists is selected, it means that this control point is selected (Step S111b in FIG. 2). Further, when a position when a control point does not exist is selected, the tone curve graph 1100 becomes the state that a new control point is newly selected and set on this position (Step S111b in FIG. 2).

In association with such operations of newly setting and selection of a control point by an operator on the operation display section 103, the control section 101 saves information about the position and color of the newly-set or selected control point as a history of an operational situation for items in connection with the tone curve (Step S118 in FIG. 2). Thereafter, if the operator operates some portion on the setting screen 1000 without pushing down the history button 1505, it becomes possible to further adjust the result of adjustment of the adjusted tone curve (Steps S104, S105, NO at S106, S111a, S112a, S113a, S114a, S115a, and S116a in FIG. 2).

In the tone curve adjustment on the tone curve graph 1100, an operator operates a some control point on the tone curve 1101Y of yellow in the vertical direction by using a pointing device of the operation display section 103 (YES at Step S112*a* in FIG. 2). With this operation, the shape of the tone curve can be changed by changing the output density of the control point (Step S112*b* in FIG. 2). At this time, in the tone curve adjustment on the tone curve graph 1100, if an operator operates a some control point on the tone curve 1101Y of yellow in the horizontal direction by using a pointing device of the operation display section 103 (YES in Step S112*a* in FIG. 2), the shape of the tone curve can be changed by changing the input density of the control point (Step S112*b* in FIG. 2).

The specific example of FIG. 4 shows the situation that the point of an input density of 57 is selected as a control point 1101Y_A1, and the adjustment is made to move the control point upward such that the output density becomes 72. Successively, the control section 101 adjusts the whole shape of the tone curve 1101Y so as pass smoothly on the adjusted control point 1101Y_A1.

In association with such operations of change of the tone curve by an operator on the operation display section 103, the control section 101 saves information about the control point and information about the amount of adjustment as a history of an operational situation for items in connection with the tone curve (Step S118 in FIG. 2). Thereafter, if the operator operates some portion on the setting screen 1000 without pushing down the history button 1505, it becomes possible to further adjust the result of adjustment of the adjusted tone curve (Steps S104, S105, NO at S106, S111*a*, S112*a*, S113*a*, S114*a*, S115*a*, and S116*a* in FIG. 2).

Figure 5:
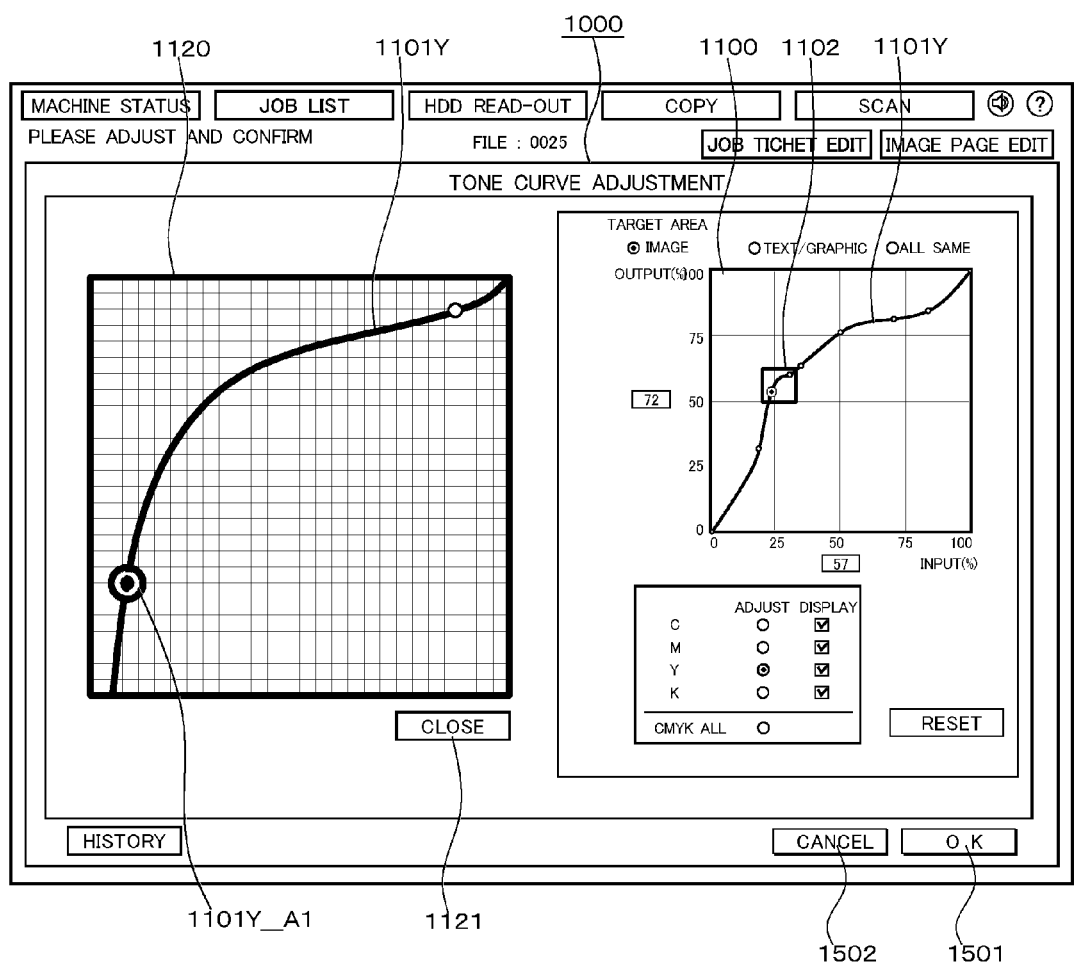
FIG. 5 is an explanatory drawing for explaining the embodiment of the present invention.

In the tone curve adjustment on the tone curve graph 1100, an operator operates so as to select a partial region 1102 being a part of the region within the tone curve graph 1100, not on the tone curve, by using a pointing device of the operation display section 103 (YES in Step S113*a* in FIG. 2). With this operation, the control section 101 enlarges the partial region 1102, and displays the tone curve graph enlarging region 1120 shown in FIG. 5 within the operation screen 1000 (Step S113*b* in FIG. 2).

With this, it becomes possible to adjust finely the tone curve by using a control-point 1101Y_A1 of the tone curve in this tone curve graph enlarging region 1120. At this time, if an operator pushes down a closing button 1121, the display of the tone curve graph enlarging region 1120 can be also ended.

In such an operation to enlarge a partial region of the tone curve graph on the operation display section 103 by an operator, the control section 101 saves the position of the partial region 1102 and the enlarging display magnification from the partial region 1102 to the tone curve graph enlarging region 1120 as a history of an operational situation for items in connection with the tone curve (Step S118 in FIG. 2). Thereafter, if the operator operates some portion on the setting screen 1000 without pushing down the history button 1505, it becomes possible to further adjust the result of adjustment of the adjusted tone curve (Steps S104, S105, NO at S106, S111*a*, S112*a*, S113*a*, S114*a*, S115*a*, and S116*a* in FIG. 2).

In the thumbnail display portion 1200, an operator operates so as to select a thumbnail image cut-out position designating portion 1210 in the thumbnail display portion 1200 by using a pointing device of the operation display section 103 (YES in Step S114*a* in FIG. 2). With this operation, the control section 101 enlarges the thumbnail image cut-out position designating portion 1210 and displays a pre-adjustment thumbnail enlarging display portion 1310 based on the gradation characteristic before the tone curve adjustment and a post-adjustment thumbnail enlarging display portion 1320 based on the gradation characteristic after the tone curve adjustment (Step S114*b* in FIG. 2). With this, it becomes possible to confirm an expression state of a desired position in detail in terms of a change of the gradation characteristic by the tone curve adjustment.

In such an operation to select the thumbnail image cut-out position designating portion 1210 by an operator on the operation display section 103, the control section 101 saves the position of the thumbnail image cut-out position designating portion 1210, the enlarging display magnification from the thumbnail image cut-out position designating portion 1210 to the pre-adjustment thumbnail enlarging display portion 1310 or the post-adjustment thumbnail enlarging display portion 1320, and the like as a history of an operational situation for items in connection with the tone curve (Step S118 in FIG. 2). Thereafter, if the operator operates some portion on the setting screen 1000 without pushing down the history button 1505, it becomes possible to further adjust the result of adjustment of the adjusted tone curve (Steps S104, S105, NO at S106, S111*a*, S112*a*, S113*a*, S114*a*, S115*a*, and S116*a* in FIG. 2).

In the thumbnail display portion 1200, an operator operates so as to superimpose a cursor on an image on one of the thumbnail display portion 1200, the pre-adjustment thumbnail enlarging display portion 1310, and the post-adjustment thumbnail enlarging display portion 1320 by using a pointing device of the operation display section 103 (YES in Step S115*a* in FIG. 2). With this operation, the control section 101 acquires the pre-adjustment density and the post-adjustment density at a pixel on the position and displays them on a pre and post adjustment density display portion 1325 (Step S115*b* in FIG. 2). With this, it becomes possible to confirm an expression state of an arbitrary position as numerical values in detail in terms of a change of the gradation characteristic by the tone curve adjustment.

In such an operation to confirm the density by an operator on the operation display section 103, the control section 101 saves the position of the pixel with the confirmed density, and the like as a history of an operational situation for items in connection with the tone curve (Step S118 in FIG. 2). Thereafter, if the operator operates some portion on the setting screen 1000 without pushing down the history button 1505, it becomes possible to further adjust the result of adjustment of the adjusted tone curve (Steps S104, S105, NO at S106, S111*a*, S112*a*, S113*a*, S114*a*, S115*a*, and S116*a* in FIG. 2).

In the thumbnail display portion 1200, an operator operates so as to double-click after superimposing a cursor on an image on one of the thumbnail display portion 1200, the pre-adjustment thumbnail enlarging display portion 1310, and the post-adjustment thumbnail enlarging display portion 1320 by using a pointing device of the operation display section 103 (YES in Step S116*a* in FIG. 2). With this operation, if a control point corresponding to the density of the position exists, the control section 101 selects the control point, or if a control point corresponding to the density of the position does not exist, the control section 101 newly sets a control point (Step S116*b* in FIG. 2). With this, it becomes possible to determine an arbitrary position on an image as a control point and to adjust a density corresponding to the position.

In such an operation to confirm the density by an operator on the operation display section 103, the control section 101 saves the position of the pixel with the confirmed density, and the like as a history of an operational situation for items in connection with the tone curve (Step S118 in FIG. 2). Thereafter, if the operator operates some portion on the setting screen 1000 without pushing down the history button 1505, it becomes possible to further adjust the result of adjustment of the adjusted tone curve (Steps S104, S105, NO at S106, S111a, S112a, S113a, S114a, S115a, and S116a in FIG. 2).

In the above adjustments (Steps S111a and S111b, S112a and S112b, S113a and S113b, S114a and S114b, S115a and S115b in FIG. 2), the history of all of the operational situations may be saved for each execution of adjustment, or the history of the operational situation may be saved for each execution of test print in the state that adjustment has been executed.

Figure 6:
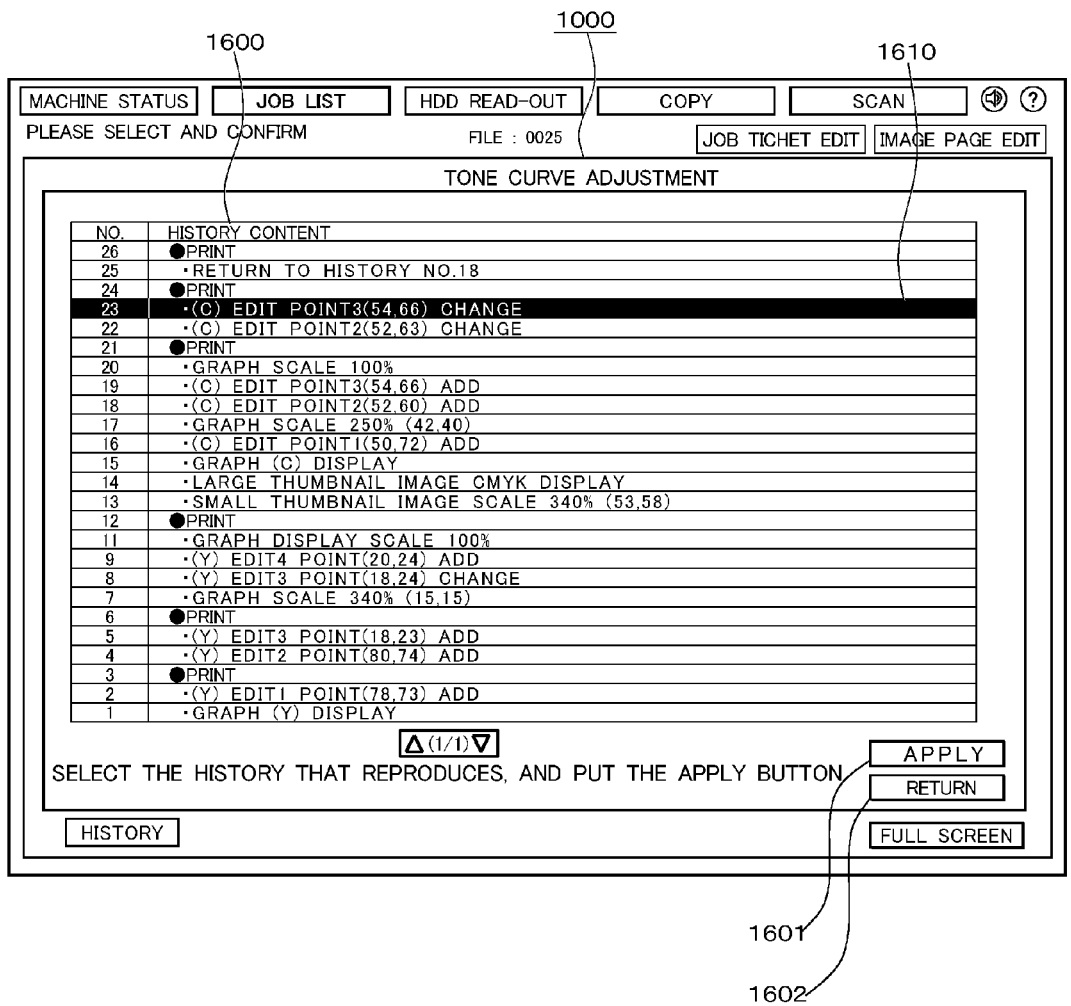
FIG. 6 is an explanatory drawing for explaining the embodiment of the present invention.

Further, when an operator pushes down the history button 1505 on the setting screen 1000 shown in FIG. 3 (YES at Step S106 in FIG. 2), the control section 101 displays the history of the past tone curve adjustments as a list on a history list screen 1600 as shown in FIG. 6 with reference to the information of the results of the saved tone curve adjustments (Step S107 in FIG. 2).

Herein, the operational situations at the time of the tone curve adjustments achieved in the above tone curve adjustments (Steps S111a and S111b, S112a and S112b, S113a and S113b, S114a and S114b, S115a and S115b, and S116a and S116b in FIG. 2), are displayed in time series.

For this reason, the specific example of the history list screen 1600 shown in FIG. 6 shows the state that History Nos. 1 to 26 are listed. In this example, although the operational situations are displayed as the history, it is also possible to save time and the name of an operator and to display them.

In this history list screen 1600, the operator can select any one history among History Nos. 1 to 25. In the example shown in FIG. 6, a history reversed-display 1610 displays the state that History No. 23 is selected by an operator.

On this history list screen 1600, if an operator pushes down a return button 1602 (NO at Step S108 in FIG. 2), the control section 101 eliminates the history list screen 1600, and return the display to the tone curve graph 1100 (Step S105 in FIG. 2).

Further, on this history list screen 1600, an operator pushes down an application button 1601 (YES at Step S108 in FIG. 2). Then, the control section 101 reads the operational situation saved as the designated past history and adopts (applies) it (Step S109 in FIG. 2), saves the adoption (application) of this past history as a history at a current time (Step S110 in FIG. 2), and reproduces the state at the time of the past adjustment on the setting screen 1000 shown in FIG. 3 based on the adopted past history (Step S104 in FIG. 2).

In this case, with the adoption of the operational situation saved as the history after execution of adjustment with regard to the above-mentioned adjustments (Steps S111a and S111b, S112a and S112b, S113a and S113b, S114a and S114b, S115a and S115b, and S116a and S116b in FIG. 2), the state at the time of the past adjustment is reproduced on the setting screen 1000 in accordance with the designated history.

In this way, since the state at the time of the past adjustment for the tone curve can be reproduced based on the information saved in association with the history at the time of the past adjustment for the tone curve, it becomes possible to return to a previously-adjusted portion (an adjusted point (a control point of the tone curve) and an amount of adjustment), and then to repeat readjustment. As a result, it becomes possible to shorten working hours for returning to a previous state, and it also becomes possible to reduce the number of processes and working hours in gradation correction for image data by using a tone curve.

Successively, if it is necessary (NO at step S117 in FIG. 2) to reproduce the state of the past adjustment by the history (Step S107 to S109 in FIG. 2), or to repeat the above adjustment (Steps S111a and S111b, S112a and S112b, S113a and S113b, S114a and S114b, S115a and S115b, and S116a and S116b in FIG. 2), by the selection of a required history, the state is reproduced or the adjustment is repeated.

On the other hand, when the above state reproduction by the above selection of a history or the above adjustment has been completed, or when there is no need for adjustment more than the above, that is, when an operator pushes down the OK button 1501 on the operation screen 1000 (YES at Step S117 in FIG. 2), the control section 101 ends the tone curve adjustment on the setting screen 1000, and checks the existence or nonexistence of a print request from an operator via a not-shown print screen (Step S119 in FIG. 2).

When an operator wishes to a print (YES at Step S119 in FIG. 2), the control section 101 applies gradation processing to image data at the image processing section 140, and executes image formation at the image forming section 150 (Step S120 in FIG. 2). At this time, the control section 101 saves various kinds of information at the time of execution of printing as print information by relating the information to the image data (Step S121 in FIG. 2), and ends the processing (End in FIG. 2). On the other hand, when an operator does not wish to a print, the control section 101 ends the processing without executing image formation (end in FIG. 2).

As mentioned above, in the present embodiment, since the state at the time of the past adjustment for a tone curve can be reproduced based on the saved past history, it becomes possible to return to the previously-adjusted portion (an adjusted point (a control point of a tone curve) and an amount of adjustment), and to repeat readjustment on the previously-adjusted portion. Further, it becomes possible to shorten working hours for returning to a previous state, and it also becomes possible to reduce the number of processes and working hours in gradation correction for image data by use of a tone curve.

Furthermore, by saving an operational situation as a history in the state including a control point and an adjustment value of a tone curve, the previous state of the tone curve can be reproduced faithfully, and it becomes possible to return the current state to the previously-adjusted state.

In addition to the control point and the adjustment value of a tone curve, by saving the operational situation as a history in the state including the display magnification of a thumbnail, the cut-out position of the thumbnail, the selection point of the thumbnail, the display magnification of a tone curve graph scale, and the like, the operational situation of the whole operation screen at the time of adjustment of a tone curve can be reproduced faithfully, and it becomes possible to return the current state to the previously-adjusted state.

Further, by saving the tone curve as a history for each adjustment for the tone curve on the setting screen, the previous state of the tone curve can be reproduced faithfully, and it becomes possible to return the current state to the state at the time of previous desirable adjustment.

Further, by saving the tone curve adjusted on the setting screen as a history for each image formation at the image forming section 150, the previous state of the tone curve at the time of image formation can be reproduced faithfully, and it becomes possible to return the current state to the state at the time of previous desirable adjustment.

Further, by saving as a history the image formation at the image forming section 150 in addition to the adjustment of the tone curve on the setting screen, the previous state of the tone curve at the time of image formation can be reproduced faithfully, and it becomes possible to return the current state to the state at the time of previous desirable adjustment. In the case of FIG. 6, History No. 3, 6, 12, 21, 24, and 26 correspond to this.

Further, by saving as a history the information regarding time and date or time in addition, the state of the tone curve at the desired time and date can be reproduced faithfully, and it becomes possible to return the current state to the state at the time of past desirable adjustment.

Further, by saving as a history operational situations for any one of each job, each page of image data, and each region in a page of image data, the previous state of the tone curve in a desirable adjustment target can be reproduced faithfully, and it becomes possible to return the current state to the state at the time of previous desirable adjustment.

Furthermore, by also saving (Step S110 in FIG. 2) as a history the matter of the adoption (Step S109 in FIG. 2) of the past history, since it becomes clear that the current state is return to what state at what time point, it becomes possible to prevent the same matter from being repeated uselessly by many times.

[Verification (1) of the Effects Attained by the Present Embodiment]

Hereafter, the comparative verification of the effect is achieved by the difference in the number of times of processing between the present embodiment and the conventional example. For examples, it is assumed the case where an operator performs the tone curve adjustment by the following procedure of (1) to (6).
(1) Check a test print and judge whether it is necessary to change the gradation of a part of color.
(2) Open a tone curve graph 1100 on the setting screen 1000.
(3) In order to check the position of images to be adjusted, select the thumbnail image cut-out position designating portion 1210 on the thumbnail display portion 1200.
(4) Determine pixel to be adjusted on the pre-adjustment thumbnail enlarging display portion 1310 or the post-adjustment thumbnail enlarging display portion 1320, and find out a control point on the tone curve corresponding to the pixel.
(5) Change the control point on the tone curve by a tone curve graph 1100.
(6) Execute a test print.

Figure 7:
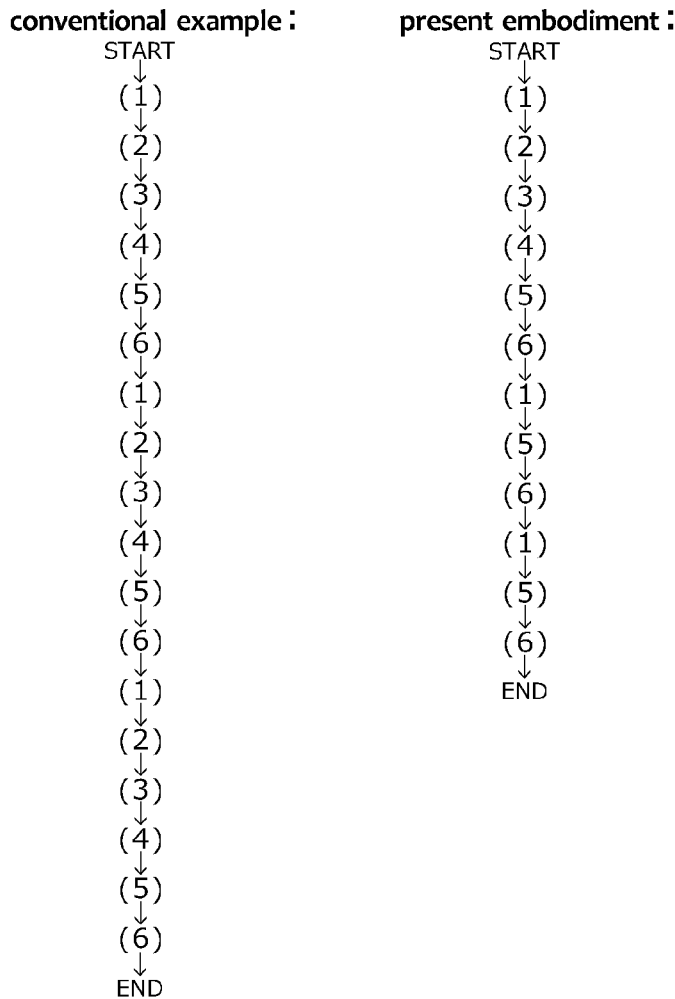
FIG. 7 is an explanatory drawing for explaining the embodiment of the present invention.

In the case where a desired state requested by an operator was attained by repeating a test print by three times, the number of times of process was 18 in the conventional example, while the number of times of process was 12 in the present embodiment as shown in FIG. 7. As a result, a large difference was caused in the number of times between the conventional example and the present embodiment.

Here, the conventional example, after one time of the adjustment for a tone curve has been completed on the setting screen 1000 of FIG. 3, when the OK button 1501 is pushed down, the setting screen 1000 is returned to the initial state. That is, the tone curve on the setting screen 1000 is reset and becomes a straight line state, and also a portion related to a thumbnail is returned to an initial standard start state. Subsequently, after the tone curve has been adjusted, in the case where, upon confirmation by printing, it becomes clear that a desired gradation is not attained, the following operations are conducted. That is, the setting screen returned to the initial state is operated depending on the operator's memory so as to look for the previously-adjusted portion (the adjusted point (control point on the tone curve) and the adjustment value), the cut-out point of an thumbnail image, and the enlargement magnification, and then the readjustment is repeated for the portion considered as being adjusted poorly at the time of previous adjustment.

On the other hand, in the present embodiment, the state at the time of the past adjustment for the tone curve can be reproducible based on the saved past history. Accordingly, it becomes possible to return to the previously-adjusted portion without looking for it, and to repeat the readjustment for the previously-adjusted portion. Therefore, it becomes possible to shorten working hours for returning a previous state, and it also becomes possible to reduce the number of processes and working hours in gradation correction for image data by use of a tone curve. Furthermore, since the present embodiment allows an operator to concentrate in adjustment work required originally, it becomes possible to adjust more appropriately and to improve the accuracy of the work

[Verification (2) of the Effects Attained by the Present Embodiment]

Hereafter, the comparative verification of the effect is achieved by the difference in the capacity of data to be stored between the present embodiment and the conventional example.

Here, the following conditions are made as the presupposition. For the same image data, the first gradation processing is performed so as to form an image, successively, the second another gradation processing is performed so as to form an image. Then, it is assumed that there is a possibility to form an image again with regard to the image of the first gradation processing and the image of the second gradation processing, and further, there is a possibility to perform another gradation processing and to form an image.

Here, in the conventional technique, it is necessary to memorize three kinds of image, i.e. the original image data, the image data having been subjected to the first gradation processing, and the image data having been subjected to the second gradation processing. On the other hand, in this embodiment, it is enough to store the original image data and to save the history of the operational situations after the second gradation processing. In this case, as compared with the data of image data, the history of the operational situations merely requires a very small amount capacity. Accordingly, as compared with the conventional technique, the memory capacity can be reduced to substantially one third (⅓).

Other Embodiments

Although the control section 101 of the image forming apparatus 100 is made to execute the above tone curve adjusting program or the image control program including the tone curve adjusting program in the above embodiment, the present invention should not be limited to this embodiment. For example, a computer used by being connected the image forming apparatus 100 may be made to execute the above tone curve adjusting program or the image control program including the tone curve adjusting program.

Further, although FIG. 1 shows the fundamental structure as the image forming apparatus 100, the printer controller may be incorporated in the image forming apparatus 100 or the printer controller may be provided separately from the image forming apparatus 100.

Furthermore, in the above embodiment, the description has been made based on the supposition of the electro-photographic type image forming apparatus 100. However, the present embodiment can be applied to various image forming apparatus and image recording apparatus (for example, thermal transfer, heat sensitive, inkjet) other than the above type so as to make it possible to improve the work efficiency.

The present U.S. patent application claims a priority under the Paris Convention of Japanese patent application No. 2012-88594 filed on Apr. 9, 2012, which shall be a basis of correction of an incorrect translation.

What is claimed is:
1. An image forming apparatus configured to form an image based on image data in accordance with information which is set for the image data at a print setting device, the image forming apparatus comprising:
- an image processing section configured to process a gradation characteristic of the image data based on a tone curve;
- an image forming section configured to form an image based on the image data processed by the image processing section; and
- a control section configured to control processing in the image processing section;
- wherein the control section has a function to adjust, as the gradation characteristic, a characteristic of output density relative to input density of image data as the tone curve via a setting screen; and
- wherein the control section saves operational situations at a time of adjustment of the tone curve on the setting screen as a history, and when the history is designated, the control section controls processing in the image processing section to process the gradation characteristic of the image data by using the saved operational situations in the designated history, the control section displays on the setting screen the image data having the processed gradation characteristics, and the control section controls the image forming section to form an image of the image data displayed on the setting screen.

2. The image forming apparatus according to claim 1, wherein the control section saves the operational situations as the history in a state including at least a control point and an adjustment value of the tone curve.

3. The image forming apparatus according to claim 1, wherein the control section saves the operational situations as the history for each time when the tone curve is adjusted on the setting screen.

4. The image forming apparatus according to claim 1, wherein the control section saves the operational situations as the history for each time when an image is formed at the image forming section in association with the adjustment of the tone curve on the setting screen.

5. The image forming apparatus according to claim 3, wherein the control section saves information regarding date and time or time additionally in the history.

6. The image forming apparatus according to claim 1, wherein the control section saves the operational situations as the history for one of each job, each page of image data, and each region in a page of image data.

7. An image formation control method for controlling an image forming apparatus which includes (i) an image processing section configured to process gradation characteristic of the image data; (ii) an image forming section configured to form an image based on the image data processed by the image processing section; and (iii) a control section configured to control processing in the image processing section; wherein the control section has a function to adjust, as the gradation characteristic, a characteristic of output density relative to input density of the image data as the tone curve via a setting screen;
wherein the method comprises:
- saving operational situations at a time of adjustment of the tone curve on the setting screen as a history; and
- when the history is designated, controlling processing in the image processing section to process the gradation characteristic of the image data by using the saved operational situations in the designated history, displaying on the setting screen the image data having the processed gradation characteristics, and controlling the image forming section to form an image of the image data displayed on the setting screen.

8. The method according to claim 7, wherein the operational situations are saved as the history in a state including at least a control point and an adjustment value of the tone curve.

9. The method according to claim 7, wherein the operational situations are saved as the history for each time when the tone curve is adjusted on the setting screen.

10. The method according to claim 7, wherein the operational situations are saved as the history for each time when an image is formed at the image forming section in association with the adjustment of the tone curve on the setting screen.

11. The method according to claim 9, wherein information regarding date and time or time is saved additionally in the history.

12. The method according to claim 7, wherein the operational situations are saved as the history for one of each job, each page of image data, and each region in a page of image data.

13. A non-transitory recording medium which stores an image control program and is readable by a computer in an image forming apparatus configured to form an image based on image data in accordance with information which is set for the image data at a print setting device, the image control program configured to make the computer perform functions of the image forming apparatus comprising:
- an image processing section configured to process a gradation characteristic of the image data based on a tone curve;
- an image forming section configured to form an image based on the image data processed by the image processing section; and
- a control section configured to control processing in the image processing section;
- wherein the control section has a function to adjust, as the gradation characteristic, a characteristic of output density relative to input density of the image data as the tone curve via a setting screen; and
- wherein the control section saves operational situations at a time of adjustment of the tone curve on the setting screen as a history, and when the history is designated, the control section controls processing in the image processing section to process the gradation characteristic of the image data by using the saved operational situations in the designated history, the control section displays on the setting screen the image data having the processed gradation characteristics, and the control section controls the image forming section to form an image of the image data displayed on the setting screen.

14. The recording medium according to claim 13, wherein the control section is made to save the operational situations as the history in a state including at least a control point and an adjustment value of the tone curve.

15. The recording medium according to claim 13, wherein the control section is made to save the operational situations as the history for each time when the tone curve is adjusted on the setting screen.

16. The recording medium according to claim 13, wherein the control section is made to save the operational situations as the history for each time when an image is formed at the image forming section in association with the adjustment of the tone curve on the setting screen.

17. The recording medium according to claim 15, wherein the control section is made to save information regarding date and time or time additionally in the history.

18. The recording medium according to claim 13, wherein the control section is made to save the operational situations as the history for one of each job, each page of image data, and each region in a page of image data.

* * * * *